Dec. 1, 1959  R. J. PETERSON  2,914,820
BAGGED-SEED TREATING DEVICE
Filed Feb. 18, 1957
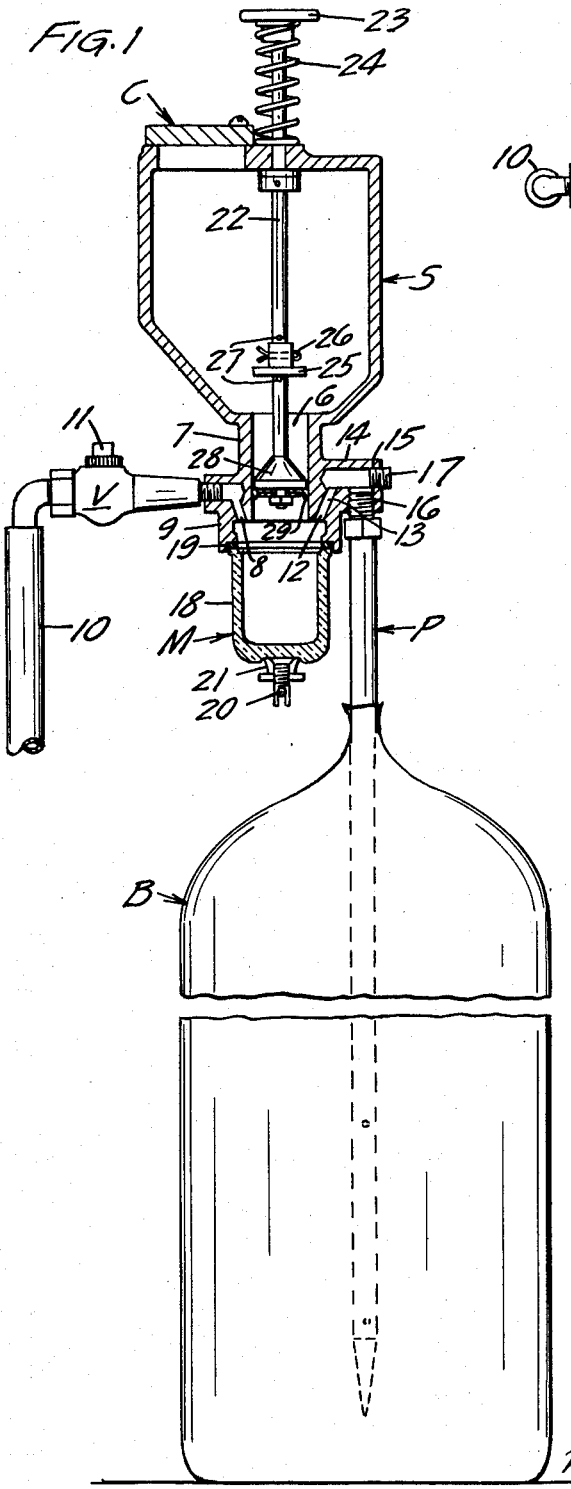
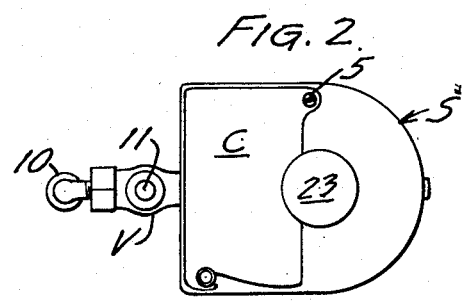
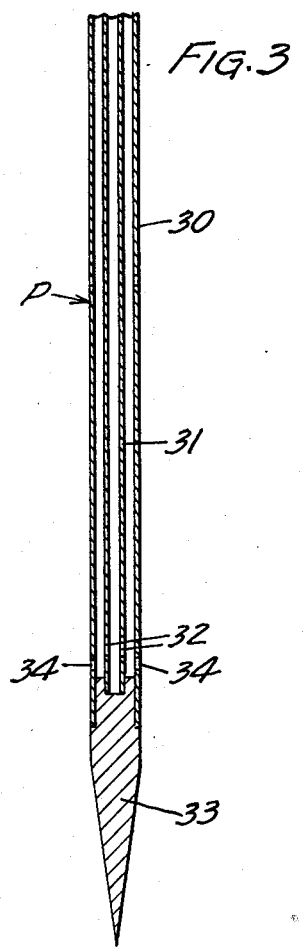
INVENTOR.
ROBERT J. PETERSON
BY
Williamson, Schroeder, Adams & Meyers
ATTORNEYS United States Patent Office 2,914,820
Patented Dec. 1, 1959

2,914,820

BAGGED-SEED TREATING DEVICE

Robert J. Peterson, Warren, Minn.

Application February 18, 1957, Serial No. 640,974

11 Claims. (Cl. 21—109)

This invention relates to material treating apparatus, and more particularly to a device for applying treating dust or powder to seeds and the like.

An object of my invention is to provide a new and improved seed treating device of simple and inexpensive construction and operation.

Another object of my invention is the provision in a seed treating device, of improved apparatus for thoroughly dispersing the treating powder in flowing air to facilitate uniform application of the treating powder to the seed.

Still another object of my invention is to provide a novel device for accurately measuring and thorough mixing treating powder with air to be injected into a supply of seeds or the like for applying the treating powder thereto.

A further object of my invention is the provision of an improved device for injecting treating powder and the like into a bag of seeds and which is constructed to provide an accurate indication to the operator of the amount of treating powder being applied to the seeds.

A still further object of my invention is to provide a new device for injecting treating powder suspended in air into a bag of seeds which mixes predetermined quantities of the powder with air at a rate slow enough so that the proper amount of air-powder mixture may be progressively applied to seeds at different depths within the bag.

A still further object of my invention is to provide a probe-type injection device for applying an air-powder mixture to seeds contained within a bag and which is constructed in such a manner as to maintain the powder in an even distribution in suspension in the air and to inject the mixture with sufficient force so as to propel at least some of the powder particles to the outside portions of the bag.

Another object of my invention is to provide a novel device for accurately measuring and thoroughly mixing treating powder with air to be injected into a supply of seeds or the like for the purpose of applying the treating powder thereto.

Another object is to provide a novel and improved device for treating seeds within a bag with a powder fungicide and which is constructed to permit the charge of powder which is introduced thereinto to be varied in size.

Another object is to provide an improved device for treating seeds within a bag with a powder fungicide and which is constructed to enable the operator to introduce the charge of fungicide quickly and easily in metered amounts and which will preclude the escape of air from the mixing chamber into the fungicide supply chamber.

Another object is to provide an improved device for treating seeds within a bag with a powder fungicide which will introduce the fungicide into the air flow slowly so as to give the operator of the device sufficient time to slide the delivering mechanism thereof back and fourth depthwise of the bag in order to insure good distribution of the fungicide.

Another object is to provide a device of the class described constructed to permit the device to be utilized equally successfully whether the bags lie upright or on their side.

These and other objects and advantages of my invention will more fully appear from the following description, made in connection with the accompanying drawings, wherein like reference characters refer to the same or similar parts throughout the several views, and in which:

Fig. 1 is a vertical sectional view through my seed treating device with the air line and the probe and bag of seeds shown in elevation;

Fig. 2 is a plan view of the device; and

Fig. 3 is a fragmentary vertical sectional view on an enlarged scale of the probe.

One embodiment of my invention may include as shown in Figs. 1–3 a supply chamber indicated generally as S which is provided with a cover member indicated generally as C which pivots about a pin 5 between open and closed positions for the purpose of introducing a supply of fungicide powder into the supply chamber when needed. It also includes a mixing chamber indicated generally as M and a probe P which is adapted to be inserted in the open end of a bag of seeds indicated generally as B.

The device as shown has an elongated material supply opening 6 which is constructed much as a cylinder or chute having walls 7. As shown, the cylinder 7 connects the interior of the supply chamber S with the interior of the mixing chamber M. At the top of the mixing chamber M there is an air inlet opening 8 which communicates via a port 9 with a compressed air line 10. Interposed within the air line 10 is a valve member V which has a button 11 for opening the valve when the button is depressed, the button being resiliently urged upwardly toward closed position.

Also disposed at the top of the mixing chamber M is an outlet opening 12 which is conected by a port 13 with a head 14 which is carried by the cylinder 7 at its opposite side relative to its connection with the air line 10. The head 14 has two internally threaded openings 15 and 16, one of which is provided with a threaded plug 17 and into the other of which is threaded the upper end of the probe P. The probe P can be threaded into either of the openings 15 or 16 as desired and for a purpose to be hereinafter described.

It will be noted that the ports 9 and 13 are directed somewhat downwardly and at an angle to each other and that they are arranged so as to avoid a linear air flow. The air inlet and the outlet opening 12 are arranged so as to provide a swirling air flow through the mixing chamber M with considerable turbulence imparted thereto as a result of the arrangement of these openings.

The mixing chamber M as shown includes a glass bowl 18 which is pressed upwardly against the gasket 19 by means of a bail 20 and longitudinally expandable threaded tightening mechanism 21 which extends between the bail and the bottom of the glass bowl and can be swung laterally to permit the glass bowl to to be removed if so desired, upon loosening of the mechanism 21.

Mounted upon the supply chamber S for longitudinal reciprocating movement and extending therethrough into the material supply opening 6 is a material delivery member which includes a piston rod 22 having a knob 23 at the upper end thereof against which a coiled spring 24 bears to urge the knob outwardly. The lower or inner portions of the piston rod 22 is provided with a pair of piston forming members which operate somewhat as a piston within the material opening 6. These include a disc-like member 25 which is secured by a cotter key 26 to the piston rod 22 by passing through one of a number of longitudinally spaced opening 27 provided for that purpose in the piston rod 22. The diameter of the disc 25 is equal to the interior diameter of the cylinder 7. At the extreme inner or lower end of the piston rod 22, there is a frusto-conically shaped enlargement 28 which carries a resiliently yieldable sealing ring 29 which permits the lower end of the piston rod 22 to be moved vertically within the cylinder 7 without permitting the escape of air at any time from the mixing chamber M upwardly into the supply chamber S.

The probe P is comprised of a pair of concentrically disposed tubes 30 and 31. These two tubes are connected at the top with only the inner tube 31 in air flow communicating relationship with the discharge opening 12 so that the air-powder mixture must flow downwardly through the inner tube 31 until it is permitted to escape into the outer tube 30 through enlarged apertures such as 32. The lower end of the outer tube 30 is closed by a conically shaped end portion 33. Only the lower end portion of the outer tube 30 is provided with a few small discharge apertures 34. The reasons for this arrangement are that by compelling the air-powder mixture to be carried to the bottom of the probe and then forced upwardly and outwardly through elevated openings, the tendency of the probe to clog is eliminated. The reason for having only a few small openings 34 at the lower end portion of the probe is to insure that sufficient pressure will be available to cause the air-powder mixture to reach the more exterior portions of the bag. I have found that if openings are provided throughout the length of the outer tube 30, there will be insufficient pressure to reach the more exterior portions of the bag.

In use the supply chamber S is filled with the fungicide powder to be used and the probe P is then inserted into the open end of the bag B. The knob 23 is then pushed downwardly and as it does so, the disc 25 and the enlarged portion 28 along with the ring 29 form a material measuring and carrying compartment in cooperation with the chute 7. In this manner an accurate amount of the powder is measured out and carried downwardly until the enlarged portion 28 moves downwardly beyond the chute 7 and into the mixing chamber M whereupon the fungicide powder measured out will drop downwardly around the enlarged portion 28 and into the bowl 18. The knob 23 is then released whereupon the piston rod returns to the position shown in Fig. 1, at which position the sealing ring 29 precludes any passage of air upwardly into the supply chamber S. The probe P having previously been inserted into the lower portions of the bag B as shown in Fig. 1, the device is then ready for distribution of the fungicide powder throughout the bag. To accomplish this, the button 11 is pressed inwardly to open the valve V and the compressed air rises into the mixing chamber M. As previously described, the air flow is non-linear, and in fact has a swirling motion which induces considerable turbulence so that the fungicide powder is gradually picked up thereby from the upper surface thereof and carried therewith into the probe P. Thus, the charge of fungicide powder is evenly distributed or introduced into the air flow over a period of time rather than in a clog or batch and because of this, it is possible to make a more even distribution of the fungicide powder throughout the seeds contained in the bag B.

As the air continues to rush through the probe and carry the fungicide powder outwardly therewith through the apertures 34, the probe P is slowly withdrawn from the sack B. As pointed out previously, the pressure will be sufficient to carry the powder to the exterior portions of the bag and as soon as the powder becomes visually apparent upon the bag, the probe is withdrawn further to a more elevated position until the entire contents of the bag has been treated.

An additional advantage of my seed treating device is the fact that the mixing chamber is transparent and is used in combination with a metering device which enables the operator to be apprised of exactly how much fungicide powder is being applied to the seeds within the bag. This is a distinct advantage for it eliminates the guess work and enables the user to be more certain that an even distribution is being accomplished.

Another advantage of my device is that the amount or charge of fungicide powder will be accurately metered or measured out as desired and this will be supplied to the air flow slowly and gradually. Moreover, it is impossible for any of the air flow to escape upwardly into the supply chamber S for the piston formed by the disc 25 and the enlarged portion 28 with its sealing ring 29 serves as an air lock at all times.

Another feature of my invention is that the metered amount may be readily varied by slidably adjusting the position of the disc 25 on the piston rod 22. This can be accomplished by removing the cotter-key 26 from the aperture 27 as shown in Fig. 1 and reinserting it in one of the other apertures 27.

It should be noted that it is possible with my seed treating device to accomplish the advantages outlined even though the bags may lie on their side instead of upright as shown in Fig. 1. When the bags lie on their side, the plug 17 is removed and the probe P is substituted therefor, the plug 17 being substituted for the probe in the opening 16. The device is equally advantageous when this has been done for use with bags lying on their side for the transparent mixing chamber M will still be at a lower elevation than the supply chamber S and the functions of the device will be the same as herein described before.

It should also be noted that by placing the charge of powder in the bottom of a bowl 18 and by introducing the air supply at the top and withdrawing the same from the top of the mixing chamber, the powder is introduced uniformly and slowly into the air flow, thus giving the operator time to slide the probe back and forth depthwise in the bag. This insures a good distribution of fungicide throughout the bag and at all depths.

It will, of course, be understood that various changes may be made in the form, details, arrangement and proportions of the parts without departing from the scope of my invention which consists of the matter shown and described herein and set forth in the appended claims.

What is claimed is:

1. A device for treating seeds and the like, comprising a body structure defining a mixing chamber, said body structure also having a material supply opening communicating with the mixing chamber and with the source of treating material, material conveying means in said material supply opening for introducing a treating material into the chamber, said chamber having a compressed air inlet opening and an outlet opening arranged to produce swirling and turbulence of air flowing therethrough, whereby the powder is intimately admixed with and dispersed throughout the turbulent air, and discharge mechanism connected with the body structure in flow communication with the outlet opening for injecting the air-powder mixture into a supply of seeds.

2. A device for treating seeds and the like, comprising a body structure defining a mixing chamber, said body structure also having a material supply opening communicating with the mixing chamber and with a source of treating material, means for alternately moving treating material through said material supply opening and into the chamber and preventing escape of air through said material supply opening, said chamber having an air inlet opening adapted for connection with a source of compressed air and also having a mixture outlet opening, said inlet and outlet openings being arranged to produce non-linear flow of air through the chamber whereby to produce mixing and dispersion of the powder in the air, and discharge mechanism connected with the body structure in flow communication with the outlet opening for injecting the air-powder mixture into a supply of seeds.

3. A device for treating seeds and the like, comprising a body structure defining a mixing chamber having a compressed air inlet opening and an outlet opening, said body structure having a material supply opening communicating with the mixing chamber and with a source of treating material, movable material supply means including an air lock in the material supply opening for introducing the treating powder into the chamber, and discharge mechanism connected with the body structure in flow communication with the outlet opening for injecting the air-powder mixture into a supply of seeds.

4. A device for treating seeds and the like, comprising a body structure defining a mixing chamber having a compressed air inlet opening and an outlet opening, said body structure also having a material supply opening communicating with the mixing chamber and with a source of treating material, a material-delivering member movably mounted in air-flow obstructing relation in said supply opening, said delivering member defining a material-measuring and carrying compartment arranged for interchangeable communication with the mixing chamber and with said source whereby to facilitate introduction of treating material into the chamber and to prevent air flow through the supply opening, means for moving the delivering member, and discharge mechanism connected with the body structure in flow-communication with the outlet opening for injecting the air-powder mixture into a supply of seeds.

5. A device for treating seeds and the like, comprising a body structure defining a mixing chamber having a compressed air inlet opening and an outlet opening and arranged to produce swirling and turbulence of the air flowing between the inlet and outlet openings, said body structure also having an elongate material supply opening communicating at one end with the mixing chamber and at the other end with a source of treating material, a reciprocating material-delivering member mounted in said supply opening and having piston-forming ends interchangeably and slidably engaging the body structure in substantially air-sealing relation, said delivering member having a transversely opening material-measuring and carrying compartment between the ends thereof for movement into successive communication with the mixing chamber and with said source, means for reciprocating said delivering member, and discharge mechanism connected with the body structure in flow communication with the outlet opening for injecting the air-powder mixture into a supply of seeds.

6. The invention set forth in claim 5 wherein one of said piston-forming ends of the delivering member is projectible into the mixing chamber and retractable into the supply opening and is constructed of resiliently yieldable material for tightly engaging the body structure in air-sealing relation.

7. A device for treating seeds and the like, comprising a body structure including a transparent wall and defining a mixing chamber, the contents of which are visually perceptible, said body structure also having a material supply opening communicating with the mixing chamber and with a source of treating material, means in said material supply opening for introducing a treating material into the chamber, said chamber having a compressed air inlet opening and an outlet opening arranged to produce swirling and turbulence of air flowing therethrough whereby the powder is intimately admixed with and dispersed through the turbulent air, valve means connected with the air inlet opening for regulating flow of compressed air into the chamber, and elongate discharge mechanism projectible into a supply of seeds and connected with the outlet opening for applying the air-powder mixture to the seeds, whereby a quantity of powder being injected into the seed supply can be readily determined by visual inspection of the mixing chamber.

8. A device for treating seeds and the like, comprising a body structure defining a mixing chamber, said body structure also having a material supply opening communicating with the mixing chamber and with a source of treating material means in said material supply opening for alternately introducing a treating material into the chamber and preventing escape of air from the chamber, said chamber having a compressed air inlet opening and an outlet opening both positioned at the top of the chamber and arranged to produce swirling and turbulence of the air in the chamber, and elongate discharge mechanism projectible into and movable in a supply of seeds and connected with the outlet opening to carry the air-powder mixture to the seed supply, whereby to facilitate intimate admixing and discharging of the air and powder at a rate to permit manual movement of the discharge mechanism in the seed supply for distributing the powder over seeds in different areas.

9. A device for treating seeds and the like comprising a body structure defining a mixing chamber having a compressed air inlet opening and an outlet opening arranged to produce swirling and turbulence of the air flowing therethrough, said body structure also having an elongate material-supply opening communicating at one end with the mixing chamber and at the other end with a source of treating material, a reciprocating material-delivering member mounted in said supply opening and including a pair of interconnected piston elements interchangeably and slidably engaging the peripheral wall of said supply opening in substantially air-sealing relation, said piston elements defining a material measuring and carrying compartment therebetween and being adjustable relative to each other for varying the size of said compartment whereby to carry predetermined quantities of treating material into the mixing chamber, means for reciprocating said delivering member, and discharge mechanism connected with the body structure in flow communication with the outlet opening for injecting the air-powder mixture into a supply of seeds.

10. A device for treating seeds and the like with treating material powder, comprising a body structure including a compressed air inlet and an air-powder mixture outlet and also including a chamber communicating with said inlet and outlet and adapted to contain a quantity of treating material, said chamber being arranged with respect to the inlet and outlet to cause air flowing therethrough to pick up and carry in dispersed condition the material in the chamber, an injection probe for applying the mixture of treating material and air into a supply of seeds contained within a bag and including a pair of concentric inner and outer tubes having adjacent lower ends and also having upper ends connected to the body structure, the inner tube being connected in flow communication with said outlet and having enlarged aperture means adjacent its lower end only providing flow communication between the inner and outer tubes, said outer tube having only a few flow-restricting apertures around the periphery thereof and disposed adjacent the lower end only thereof, whereby to maintain the treating material in a suspended state in the moving compressed air and to move the material-air mixture with substantial force outwardly into the supply of seeds so as to penetrate to the wall of the bag.

11. A device for treating seeds and the like comprising a body structure defining a mixing chamber having a compressed air inlet opening and a pair of outlet openings, said body structure also having a material supply opening communicating with the mixing chamber and with a source of treating material, said outlet openings extending substantially normally to each other, a material delivering member movably mounted in air flow obstructing relation in said supply opening, said delivering member defining a material measuring and carrying compartment arranged for interchangeable communication with the mixing chamber and with said source whereby to facilitate introduction of treating material into the chamber and to prevent air flow through the supplying opening, means for moving said delivering member, discharge mechanism connected with the body structure in flow-communication with one of said outlet openings for injecting the air-powder mixture into a bag of seeds, and means for removably plugging the other of said outlet openings, said last mentioned means and said discharge mechanism being interchangeable in said outlet openings.

References Cited in the file of this patent

UNITED STATES PATENTS

| | | |
|---|---|---|
| 1,205,036 | Settevig | Nov. 14, 1916 |
| 2,083,153 | Irish | June 8, 1937 |
| 2,606,096 | Berkner | Aug. 5, 1952 |

FOREIGN PATENTS

| | | |
|---|---|---|
| 17,316 | Australia | of 1910 |
| 471,958 | Italy | June 3, 1952 |
| 270,169 | Switzerland | Nov. 1, 1950 |